US008661636B2

(12) United States Patent
Lin et al.

(10) Patent No.: US 8,661,636 B2
(45) Date of Patent: Mar. 4, 2014

(54) METAL SHELL CUTTING AND ASSEMBLING MACHINE

(75) Inventors: Yu-feng Lin, Tu Cheng (TW); Kuo-chuan Chiu, Tu Cheng (TW); Feng-chi Lee, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 789 days.

(21) Appl. No.: 12/884,375

(22) Filed: Sep. 17, 2010

(65) Prior Publication Data

US 2012/0066891 A1 Mar. 22, 2012

(51) Int. Cl.
*B23P 21/00* (2006.01)
*H01R 43/20* (2006.01)

(52) U.S. Cl.
USPC ............ 29/33 M; 29/33 K; 29/33 Q; 29/33 S; 29/564.6; 29/747; 29/759; 29/876

(58) Field of Classification Search
USPC ...... 29/33 M, 33 K, 33 Q, 33 S, 564.6, 564.2, 29/564.1, 564, 747, 748, 755, 759, 876, 29/884
See application file for complete search history.

(56) References Cited

U.S. PATENT DOCUMENTS

| | | | | |
|---|---|---|---|---|
| 2,613,432 | A * | 10/1952 | Gilbert et al. | 29/33 M |
| 4,142,285 | A * | 3/1979 | Brown | 29/564.6 |
| 4,912,823 | A * | 4/1990 | Shah et al. | 29/33 M |
| 5,483,857 | A * | 1/1996 | Ziberna | 83/945 |
| 5,507,087 | A * | 4/1996 | Kugo | 29/564.2 |
| 5,575,058 | A * | 11/1996 | Nakamura et al. | 29/748 |
| 5,666,719 | A * | 9/1997 | Bair | 29/33 M |
| 8,272,114 | B2 * | 9/2012 | Yang et al. | 29/283 |
| 2012/0055304 | A1 * | 3/2012 | Lee et al. | 83/419 |
| 2012/0102700 | A1 * | 5/2012 | Wei et al. | 29/33 K |

* cited by examiner

*Primary Examiner* — Erica E Cadugan
(74) *Attorney, Agent, or Firm* — Cheng-Ju Chiang

(57) ABSTRACT

Provided is a metal shell cutting and assembling machine for cutting a material tape with metal shells and assembling the metal shell with a plastic body of a connector. The metal shell cutting and assembling machine includes a frame, a material-feeding mechanism, a pre-press mechanism, a metal shell-cutting mechanism, a plastic body-inserting mechanism, a metal shell-inserting mechanism and a controller. The material-feeding mechanism is used for transferring the material tape. The pre-press mechanism can pre-press the metal shell of the material tape for being cut by the metal shell-cutting mechanism. The metal shell-inserting mechanism can push the metal shell held between the pre-press mechanism and the metal shell-cutting mechanism onto the plastic body-inserting mechanism, and the plastic body-inserting mechanism pushes the plastic body for assembling with the metal shell. Whereby the metal shell cutting and assembling machine can enhance the manufacture efficiency and reduce the labor cost.

10 Claims, 12 Drawing Sheets

METAL SHELL CUTTING AND ASSEMBLING MACHINE

BACKGROUND OF THE INVENTION

1. Field of the Invention

The present invention relates to a metal shell cutting and assembling machine, and more particularly to a machine capable of cutting away metal shells from a material tape and assembling the metal shell with a plastic body of a connector.

2. Description of the Prior Art

With the development of science and technology, it has been possible for enterprise to continue to improve the assembly efficiency and the quality of electrical products, and reduce the cost thereof. Correspondingly, it becomes more and more important for automatically assembling of the electrical products to employ high integrated and high intelligent device. Connectors are one of the electrical products.

For the connectors, the source material of metal shells of the connectors is generally a roll of metal sheet. As a convenience for plating, the metal shells of the connectors are configured to connect together with a material tape under the condition of having no specific demand. A pre-break section is located between the material tape and each metal shell. When assembling, the operator may take the metal shell by his hand, and then bend up and down the pre-break section to make the metal shell detach from the material tape. It is followed that the operator pre-inserts a plastic body of the connector into the metal shell and lastly puts them into a tool for being pressed completely, thereby completing to assemble the metal shell and the plastic body of a connector.

But both detaching the metal shell from the material tape and pre-inserting the plastic body into the metal shell are completed by the manual operation. On one hand, the manual operation can result in many problems such as increasing the labor intensity of the operator, reducing the manufacture efficiency and increasing the labor cost, and is disadvantageous for mass production. On the other hand, the manual operation may make the assembled product apt to be oxidized and deformed so the product quality is difficult to be ensured and the defective rate of the product is high.

BRIEF SUMMARY OF THE INVENTION

An object of the present invention is to provide a metal shell cutting and assembling machine, being capable of automatically cutting away metal shells from a material tape and automatically assembling the metal shell with a plastic body of a connector so that enhancing the manufacture efficiency, reducing the labor cost, being suitable for mass production, and having a good uniformity of product quality and a high qualification rate.

To achieve the above object, in accordance with the present invention, a metal shell cutting and assembling machine is provided for cutting away metal shells from a material tape and assembling the metal shell with a plastic body of a connector. The metal shell cutting and assembling machine comprises a frame, a material-feeding mechanism, a pre-press mechanism, a metal shell-cutting mechanism, a plastic body-inserting mechanism, a metal shell-inserting mechanism and a controller.

The frame has a material tape-transferring channel provided for carrying the material tape.

The material-feeding mechanism is mounted on the frame below the material tape-transferring channel and adjacent to an input port of the material tape-transferring channel, and comprises a material tape-driving member and a pulling claw.

Wherein one end of the pulling claw can be engaged with the material tape and the other end thereof is pivotally connected to the material tape-driving member, and the material tape-driving member can drive the pulling claw to move back and forth along the material tape-transferring channel.

The pre-press mechanism is mounted on the frame above the material tape-transferring channel and adjacent to an output port of the material tape-transferring channel, and comprises a metal shell pressure plate, a pressure plate-driving member and a spring member. Wherein the spring member is elastically mounted between the pressure plate-driving member and the metal shell pressure plate, the pressure plate-driving member is fixedly connected to the metal shell pressure plate and can drive the metal shell pressure plate to move toward the metal shell of the material tape for being capable of pressing the metal shell.

The metal shell-cutting mechanism is mounted on the frame below the material tape-transferring channel, faces to the pre-press mechanism, and comprises a metal shell-cutting driving member, a metal shell cutter and a metal shell die base cooperating with the metal shell cutter in cutting the metal shell. Wherein the metal shell die base is located at the output port of the material tape-transferring channel and disposes a waste material passage provided for transferring a waste material, the metal shell-cutting driving member is connected to the metal shell cutter and can drive the metal shell cutter to move along the metal shell die base for cutting away the metal shell of the material tape transferred from the material-feeding mechanism and for detaching the metal shell and the waste material, and the metal shell after detached is held between the metal shell pressure plate and the metal shell cutter.

The plastic body-inserting mechanism is disposed on the frame outside of the output port of the material tape-transferring channel, and comprises a frame body, a plastic body-pushing driving member and a plastic body-pushing rod. Wherein the body frame has a plastic body-transferring passage for carrying the plastic body and a push rod passage perpendicularly communicating with the plastic body-transferring passage, the push rod passage is parallel disposed above the material tape-transferring channel, horizontal central lines of the push rod passage and the material tape-transferring channel coincide with each other, and the plastic body-pushing driving member can drive the plastic body-pushing rod to move in the push rod passage for pushing the plastic body to be assembled with the metal shell.

The metal shell-inserting mechanism is mounted on the frame above the material tape-transferring channel and adjacent to the input port of the material tape-transferring channel, and comprises a metal shell-pushing rod and a metal shell-pushing driving member, wherein the metal shell-pushing driving member can drive the metal shell-pushing rod to move along the push rod passage and further push the metal shell to move unto the push rod passage for being assembled with the plastic body.

The controller is electrically connected to the material tape-driving member, the pressure plate-driving member, the metal shell-cutting driving member, the plastic body-pushing driving member and the metal shell-pushing driving member.

Based on the above description, the metal shell cutting and assembling machine as provided by the present invention employs the material-feeding mechanism to automatically transfer the material tape, and employs the pre-press mechanism to firmly press the metal shell on the material tape transferred by the material-feeding mechanism, and employs the metal shell-cutting mechanism can cut away the metal shell pressed by the pre-press mechanism. So the metal shell cutting and assembling machine can automatically cut the material tape with the metal shell. Moreover, the metal shell cutting and assembling machine also employs the metal shell-inserting mechanism to push the metal shell, which is held between the pre-press mechanism and the metal shell-cutting mechanism, onto the plastic body-inserting mechanism, so that the plastic body coming from the plastic body-inserting mechanism and the metal shell coming from the metal shell-inserting mechanism can be assembled together. Therefore, the metal shell cutting and assembling machine can be capable of automatically assemble the metal shell with the plastic body. The metal shell cutting and assembling machine can enhance the manufacture efficiency, reduce the labor cost and be suitable for mass production. Moreover the obtained assembling component has a good uniformity and a high qualification rate.

DETAILED DESCRIPTION OF THE PREFERRED EMBODIMENTS

The following embodiment with reference to the accompanying drawings now has been given for detail describing the technology, the feature, the object and the effect of the present invention.

Figure 1:
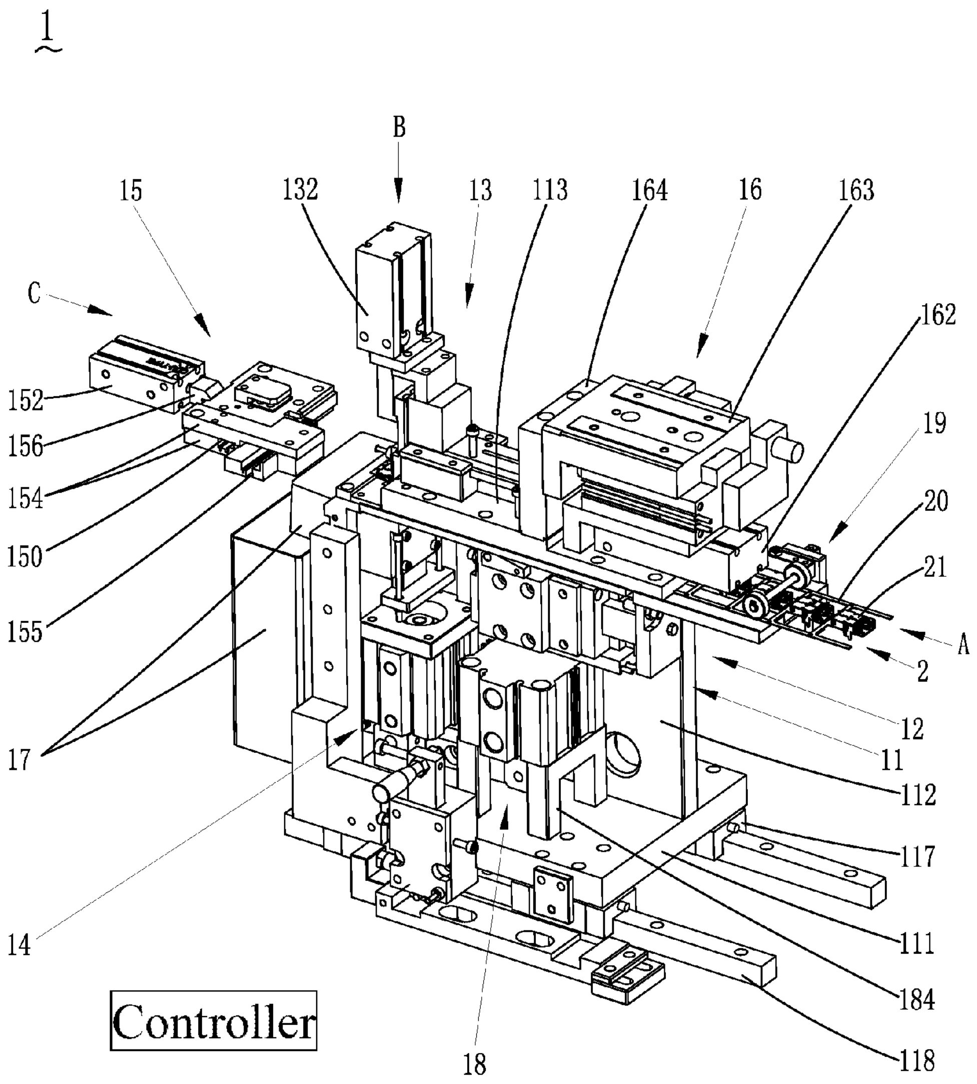
FIG. 1 is a perspective view of a metal shell cutting and assembling machine, on which a material tape is placed, according to one embodiment of the present invention.
Figure 2:
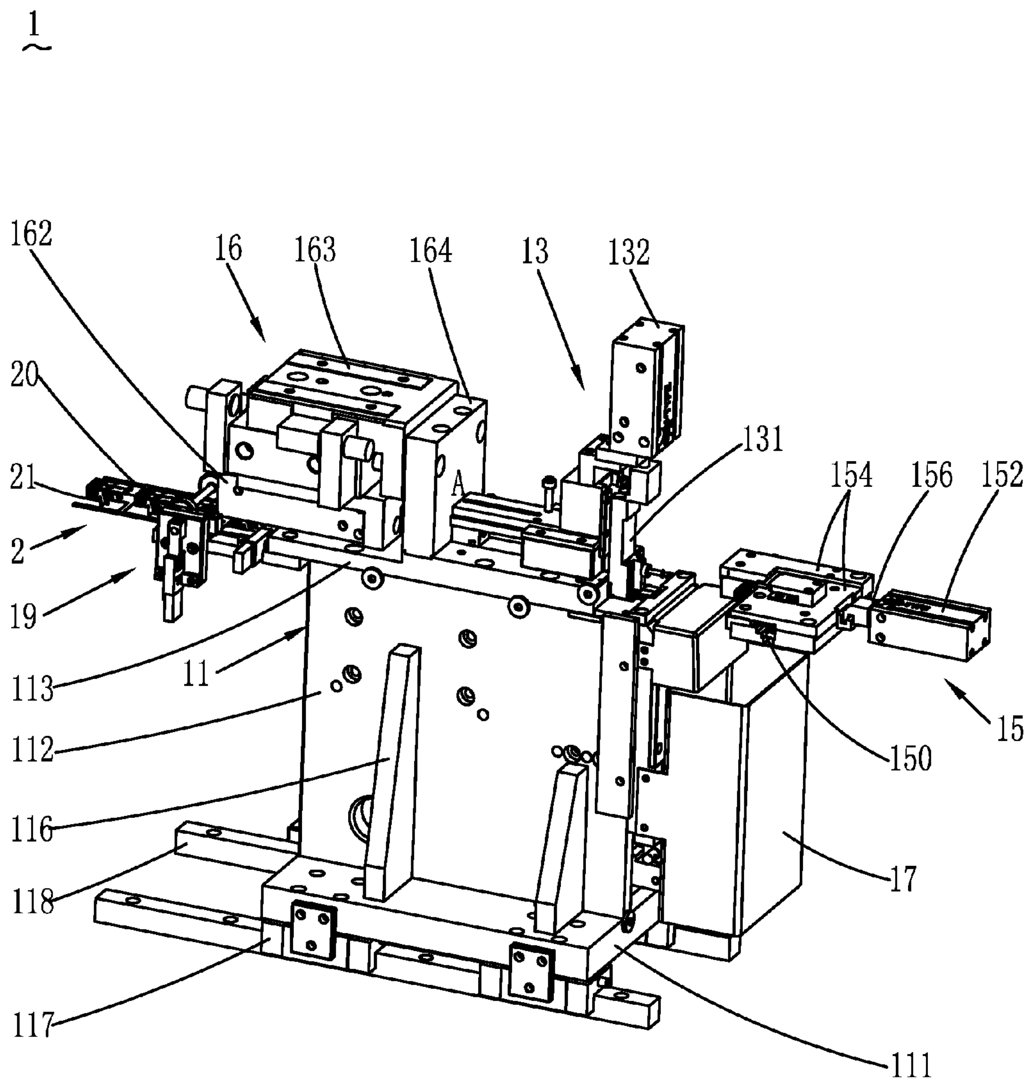
FIG. 2 is another perspective view of the metal shell cutting and assembling machine of FIG. 1.
Figure 3:
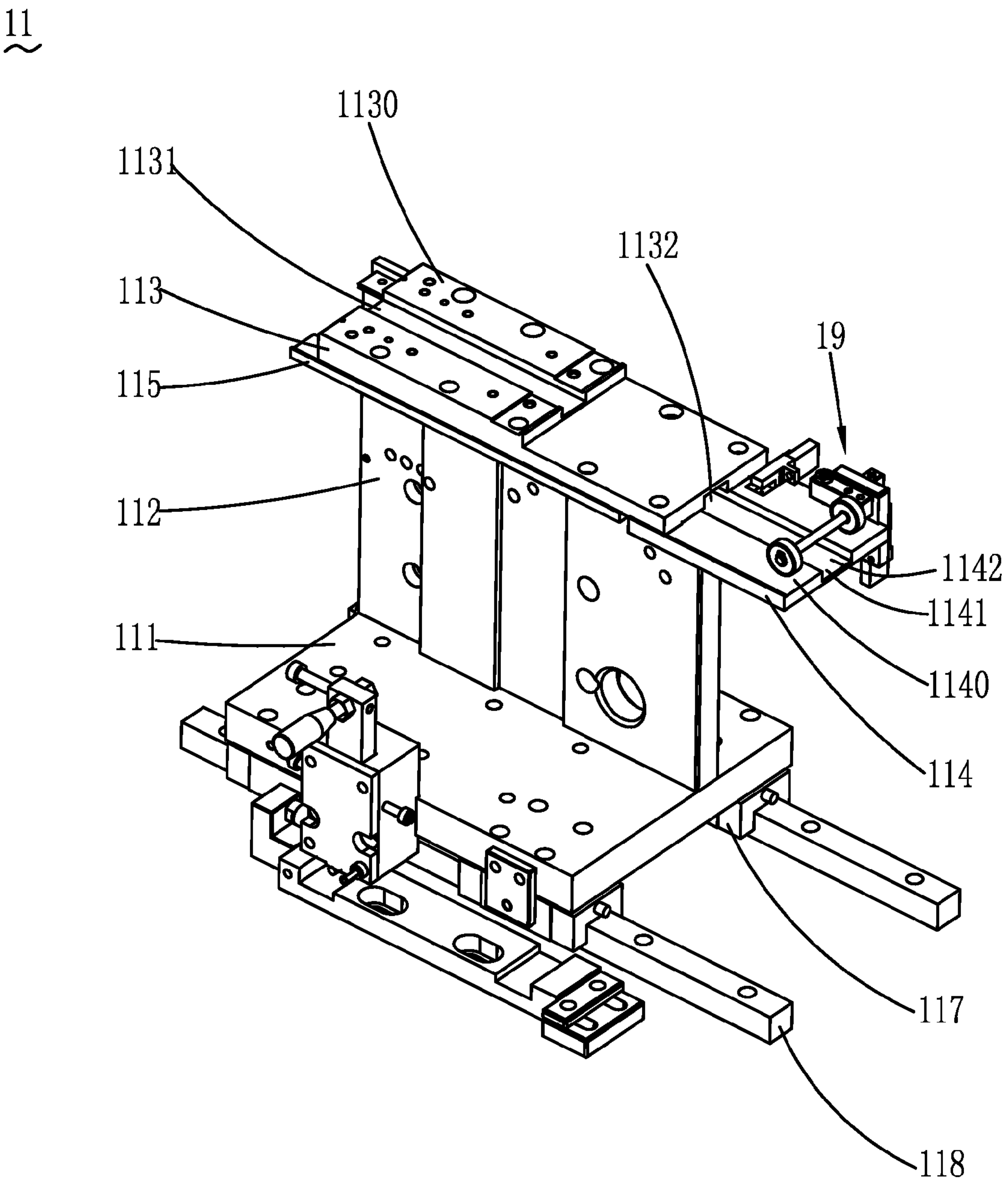
FIG. 3 is a perspective view of a frame of the metal shell cutting and assembling machine of FIG. 1.
Figure 4:
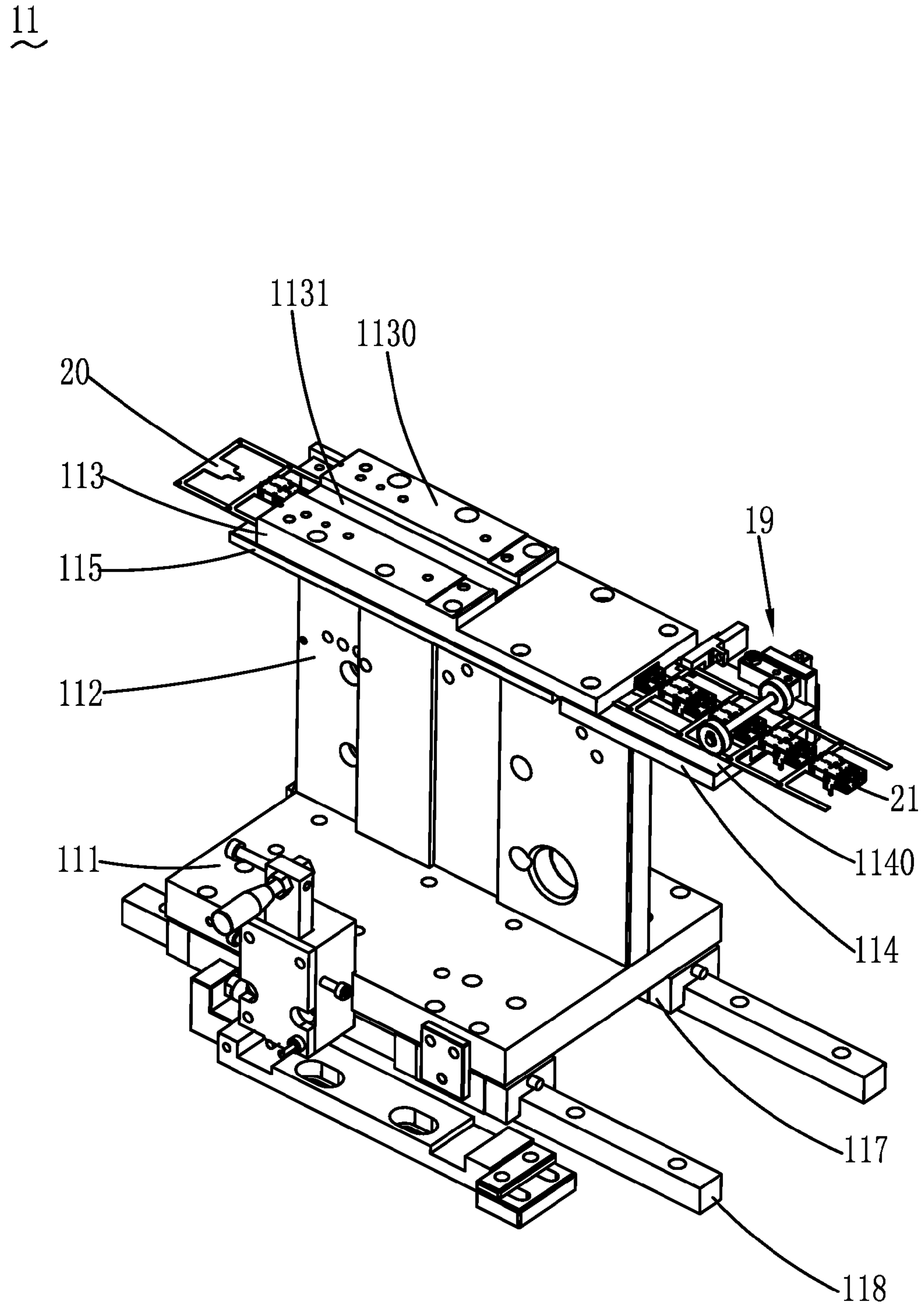
FIG. 4 is a perspective view of the frame of FIG. 3, on which the material tape is mounted.
Figure 12:
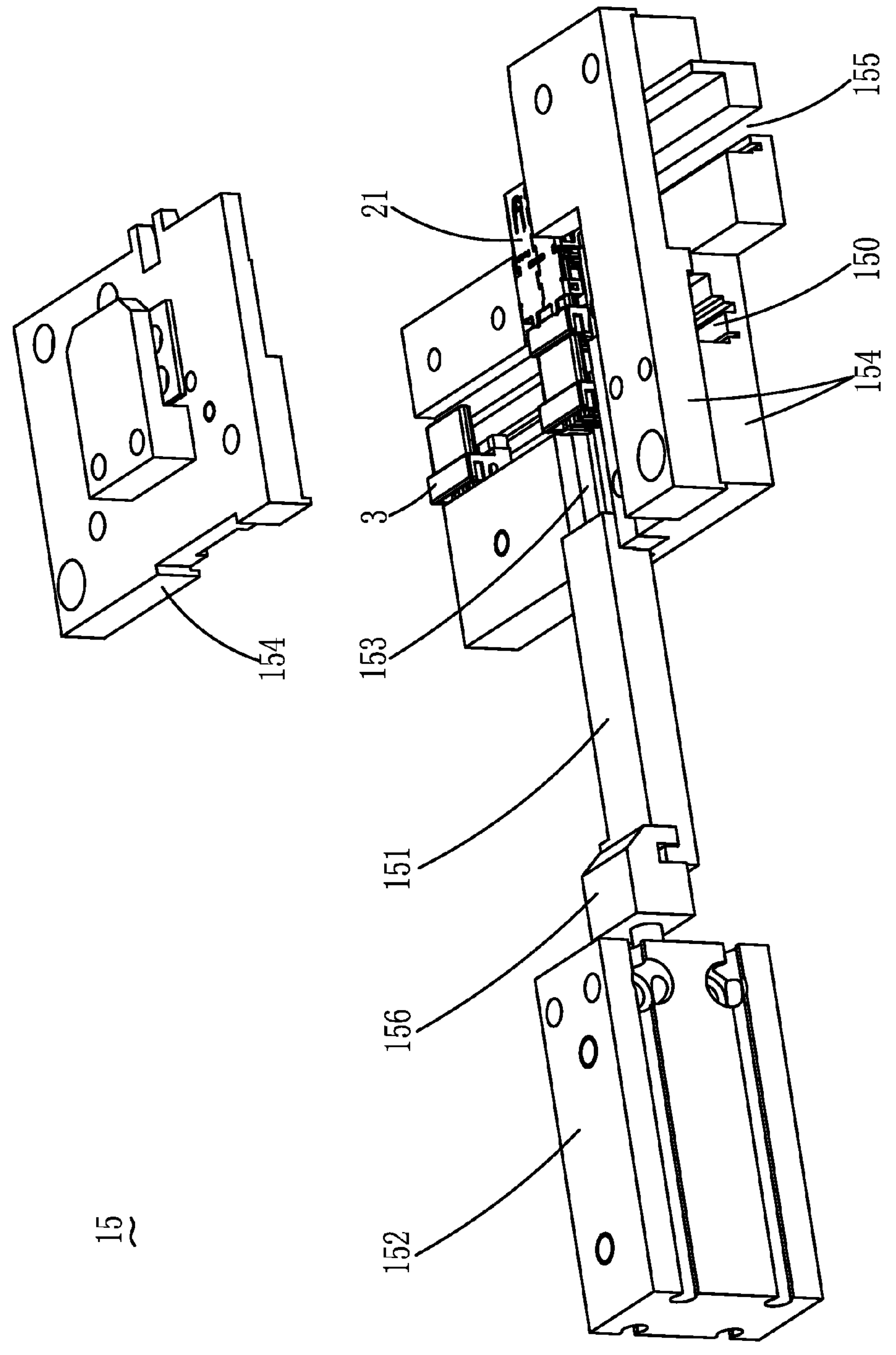
FIG. 12 is an exploded view of the plastic body-inserting mechanism of FIG. 11.

Please refer to FIGS. 1 to 3, a metal shell cutting and assembling machine 1 of the present invention is used for cutting a material tape 2 with metal shells 21 and assembling the metal shell 21 with a plastic body 3 of a connector, as shown in FIG. 12. The metal shell cutting and assembling machine 1 comprises a frame 11, a material-feeding mechanism 12, a pre-press mechanism 13, a metal shell-cutting mechanism 14, a plastic body-inserting mechanism 15, a metal shell-inserting mechanism 16 and a controller (schematically represented in FIG. 1). The frame 11 has a material tape-transferring channel provided for transferring the material tape. The metal shell-inserting mechanism 16 is mounted on the frame 11 above the material tape-transferring channel and is adjacent to an input port 1142 (labeled in FIG. 3) of the material tape-transferring channel. The pre-press mechanism 13 is mounted on the frame 11 above the material tape-transferring channel and is adjacent to an output port 1133 (labeled in FIG. 5) of the material tape-transferring channel. The material-feeding mechanism 12 is mounted on the frame 11 below the material tape-transferring channel and is adjacent to the input port 1142 of the material tape-transferring channel. The metal shell-cutting mechanism 14 is mounted on the frame 11 below the material tape-transferring channel and faces to the pre-press mechanism 13. When the pre-press mechanism 13 firmly presses the metal shell 21 of the material tape 2, the metal shell-cutting mechanism 14 can cut away the metal shell 21 from the material tape 2. The plastic body-inserting mechanism 15 is disposed on the frame 11 outside of the output port 1133 of the material tape-transferring channel, and can insert the plastic body 3 into the metal shell 21 pushed by the metal shell-inserting mechanism 16. The controller controls the coordinated movements of the material-feeding mechanism 12, the pre-press mechanism 13, the metal shell-cutting mechanism 14, the plastic body-inserting mechanism 15 and the metal shell-inserting mechanism 16. The specific movements are described as follows:

Please refer to FIGS. 1 to 4, the frame 11 has a bottom plate 111, a supporting plate 112 and a channel component defining the material tape-transferring channel. The bottom plate 111 is parallel to a horizontal plane. The supporting plate 112 is stood on the bottom plate 111. The channel component is mounted on the supporting plate 112. For convenience to adjust the position of the bottom plate 111, the bottom plate 111 is fixed to a sliding block 117, which is mounted on a guiding rail 118 provided for the sliding block 117 sliding thereon. In order to enhance the supporting force of the bottom plate 111 and the supporting plate 112, a plurality of reinforcing ribs 116 is disposed on a connection position of the bottom plate 111 and the supporting plate 112. The channel component includes an upper leading plate 113 and a lower leading plate 114. Two sides of the upper leading plate 113 are mounted on the supporting plate 112, and one end of the upper leading plate 113 is fixedly and straightly connected to the lower leading plate 114. The upper leading plate 113 and the lower leading plate 114 are under the state of parallel connection. The upper leading plate 113 disposes a push rod-sliding groove 1131 formed on a top surface 1130 thereof and provided for a push rod 161 (labeled in FIG. 5) sliding. An upper transferring channel 1132 is formed on a bottom surface of the upper leading plate 113. A lower transferring channel 1141 is formed on a top surface 1140 of the lower leading plate 114 and corresponding to the upper transferring channel 1132. The upper transferring channel 1132 and the lower transferring channel 1141 together form the material tape-transferring channel to transfer the material tape 2. In order to make the material tape 2 be more reliably transferred in the material tape-transferring channel, blocking plates 115 are formed on two sides of the bottom surface of the upper leading plate 113. A flattening device 19 is located adjacent to the input port 1142 of the material tape-transferring channel. It is noteworthy that the input port 1142 of the material tape-transferring channel is one end of the lower transferring channel 1141, which is apart from the upper leading plate 113; and the output port 1133 of the material tape-transferring channel is one end of the upper transferring channel 1132, which is apart from the lower leading plate 114.

Referring to FIGS. 1, 2, 8 and 9, the material-feeding mechanism 12 is mounted on the frame 11 below the material tape-transferring channel, as shown in FIG. 3. The material-feeding mechanism 12 is adjacent to the input port 1142 (labeled in FIG. 3) of the material tape-transferring channel. The material-feeding mechanism 12 includes a material tape-driving member, a pulling claw 121, a shaking block 123 and a pivot shaft (not shown in all FIGS). In this embodiment, the material tape-driving member is a material tape-transferring cylinder 122, which is mounted on the supporting plate 112 below the material tape-transferring channel and is electrically connected to the controller. The pulling claw 121 has a tip end 1211 for being inserted into a positioning hole of the material tape 2. For convenience to feed and release the material tape 2 by the pulling claw 121, a left side of the tip end 1211 is configured to a vertical flat surface, and a right side thereof is an inclined surface. To be convenient for the shaking block 123 driving the pulling claw 121 to draw the material tape 2, the pulling claw 121 and the shaking block 123 are straightly jointed together, and are reversely fixed two sides of the pivot shaft. The pivot shaft is rotatably mounted on the material tape-transferring cylinder 122. When the tip end 1211 of the pulling claw 121 is inserted into the positioning hole of the material tape 2, the pulling claw 121 and the shaking block 123 are parallel to one horizontal plane, and the shaking block 123 can be prevented by the frame 11 from rotating along clockwise. The clockwise is based on the shaking block 123 shown in FIG. 8. When the material tape-transferring cylinder 122 moves back and forth along the direction of the material tape-transferring channel, it can drive the pulling claw 121 to also move back and forth along the direction of the material tape-transferring channel. Because the tip end 1211 of the pulling claw 121 is inserted into the positioning hole of the material tape 2, the left side of the tip end 1211 is a vertical flat surface and the right side thereof is an inclined surface, the pulling claw 121 can transfer the material tape 2 only along a single direction thereby satisfying the cutting demand of the material tape 2.

Referring to FIGS. 1, 2, 6 and 7, the pre-press mechanism 13 is mounted on the frame 11 above the material tape-transferring channel, as shown in FIG. 3. And the pre-press mechanism 13 is adjacent to the output port 1133 (labeled in FIG. 5) of the material tape-transferring channel. The pre-press mechanism 13 includes a metal shell pressure plate 131, a pressure plate-driving member and a spring member (not shown in all FIGS). In this embodiment, the pressure plate-driving member is a pressure plate-driving cylinder 132, which is mounted on a cylinder fixture plate 133 and is electrically connected to the controller. The cylinder fixture plate 133 is mounted on a pressure plate-mounting plate 134, which is mounted on the upper leading plate 113. The spring member is elastically mounted between the cylinder fixture plate 133 and the metal shell pressure plate 131 so that the cylinder fixture plate 133 and the metal shell pressure plate 131 are elastically contacted with each other. An output shaft of the pressure plate-driving cylinder 132 is connected to one end of a cylinder-connecting block 135. The other end of the cylinder-connecting block 135 is connected to the metal shell pressure plate 131 for driving the metal shell pressure plate 131 to move toward the metal shell 21 for pressing the metal shell 21. In order to make the metal shell pressure plate 131 more stably and more reliably press the metal shell 21 of the material tape 2, the pressure plate-mounting plate 134 disposes a pressure plate-sliding groove (not shown in all FIGS), which can guide the metal shell pressure plate 131 to slide therein. The metal shell pressure plate 131 disposes a pressure plate-guiding rail to engage with the pressure plate-sliding groove.

Referring to FIGS. 1, 2, 8 and 9, the metal shell-cutting mechanism 14 is mounted on the frame 11 below the material tape-transferring channel, as shown in FIG. 3. The metal shell-cutting mechanism 14 faces to the pre-press mechanism 13 so that the mechanisms 14, 13 are separately located right below and right above the material tape-transferring channel, thereby ensuring that the metal shell-cutting mechanism 14 and the pre-press mechanism 13 can cooperate in harmony. The metal shell-cutting mechanism 14 includes a metal shell-cutting driving member, a metal shell cutter 141, a metal shell die base 143 cooperating with the metal shell cutter 141 in cutting the metal shell 21, and a cutter fixture seat 144. In this embodiment, the metal shell-cutting driving member is a metal shell-cutting cylinder 142 electrically connected to the controller. The metal shell die base 143 is straightly connected to the output port 1133 of the material tape-transferring channel and is mounted on the supporting plate 112. The metal shell die base 143 disposes a waste material passage (not shown in all FIGS), in which a waste material 20 remained after cutting away the metal shell 21 by the metal shell-cutting mechanism 14 can be continuously transferred. The metal shell-cutting cylinder 142 is mounted on the supporting plate 112 and can drive the metal shell cutter 141 to move toward the metal shell die base 143 for cutting the material tape 2 coming from the material-feeding mechanism 12 and for detaching the metal shell 21 and the waste material 20 from the material tape 2. The metal shell 21 after detached is held between the metal shell pressure plate 131 and the metal shell cutter 141. The cutter fixture seat 144 is mounted on the supporting plate 112 and disposes a cutter-sliding groove (not shown in all FIGS) provided for the metal shell cutter 141 sliding therein. The metal shell cutter 141 is mounted on the cutter fixture seat 144 and can freely slide thereby making the metal shell cutter 141 be capable of reliably working.

Referring to FIGS. 1, 2, 11 and 12, the plastic body-inserting mechanism 15 is disposed on the frame 11 outside of the output port 1133 of the material tape-transferring channel, as shown in FIG. 3. The plastic body-inserting mechanism 15 can push the plastic body 3 to make it be inserted into the metal shell 21, which is coming from and pushed by the metal shell-inserting mechanism 16. The plastic body-inserting mechanism 15 includes a frame body 154, a plastic body-pushing driving member and a plastic body-pushing rod 151. The frame body 154 forms a plastic body-transferring passage 150 and a push rod passage 153 perpendicularly communicating with the plastic body-transferring passage 150. The push rod passage 153 is parallel disposed above the material tape-transferring channel. Horizontal central lines of the push rod passage 153 and the material tape-transferring channel coincide with each other. In one embodiment, the plastic body-pushing driving member is a plastic body-pushing cylinder 152 electrically connected to the controller. An output shaft of the plastic body-pushing cylinder 152 is connected to one end of a plastic body-pushing head 156, and the other end of the plastic body-pushing head 156 is fixedly connected to the plastic body-pushing rod 151 for driving the plastic body-pushing rod 151 to move along the push rod passage 153 thereby pushing the plastic body 3 to make it be assembled with the metal shell 21.

Figure 5:
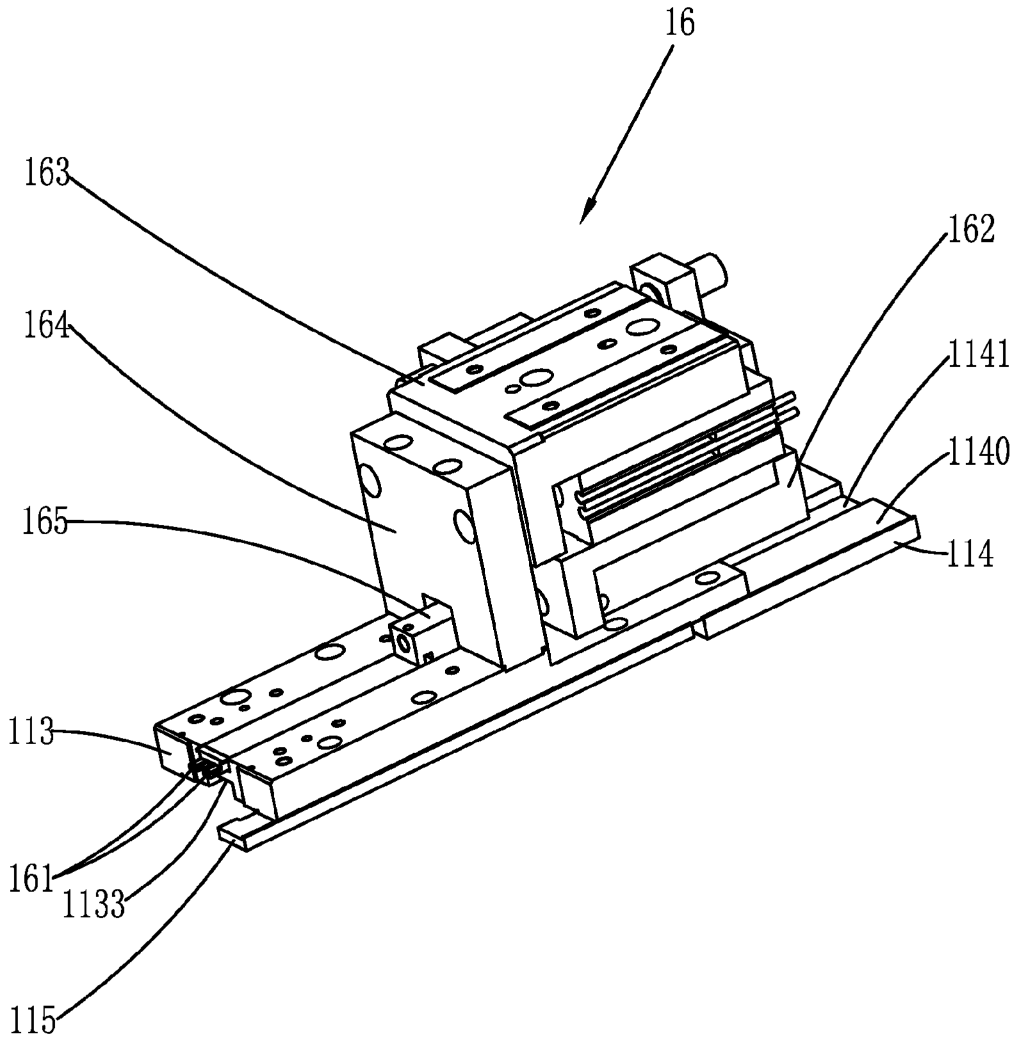
FIG. 5 is a perspective view of a metal shell-inserting mechanism of the metal shell cutting and assembling machine of FIG. 1, wherein the metal shell-inserting mechanism is mounted on an upper leading plate.
Figure 6:
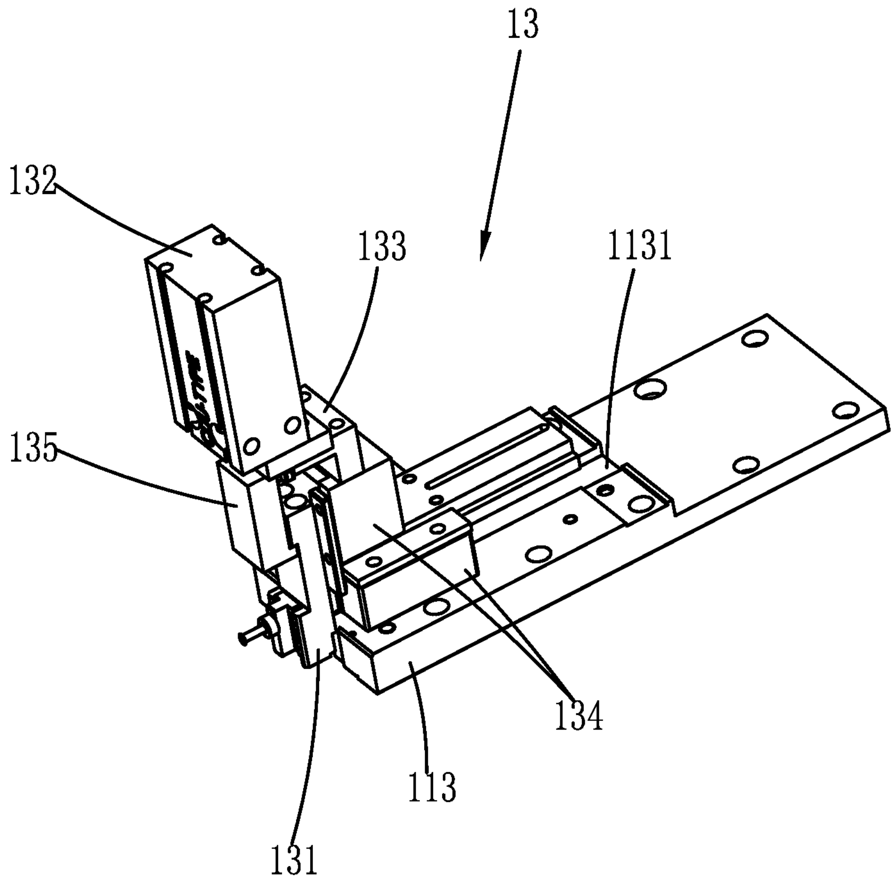
FIG. 6 is a perspective view of a pre-press mechanism of the metal shell cutting and assembling machine of FIG. 1, wherein the pre-press mechanism is mounted on an upper leading plate.
Figure 7:
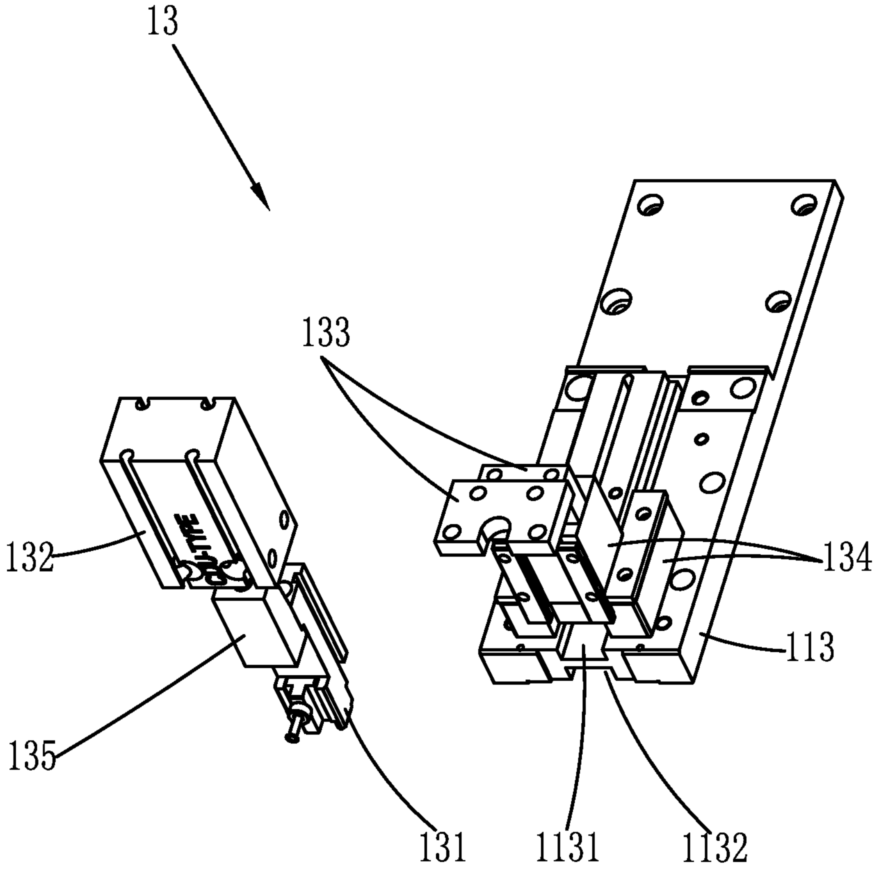
FIG. 7 is an exploded view of the pre-press mechanism of FIG. 6, which is mounted on the upper leading plate.
Figure 8:
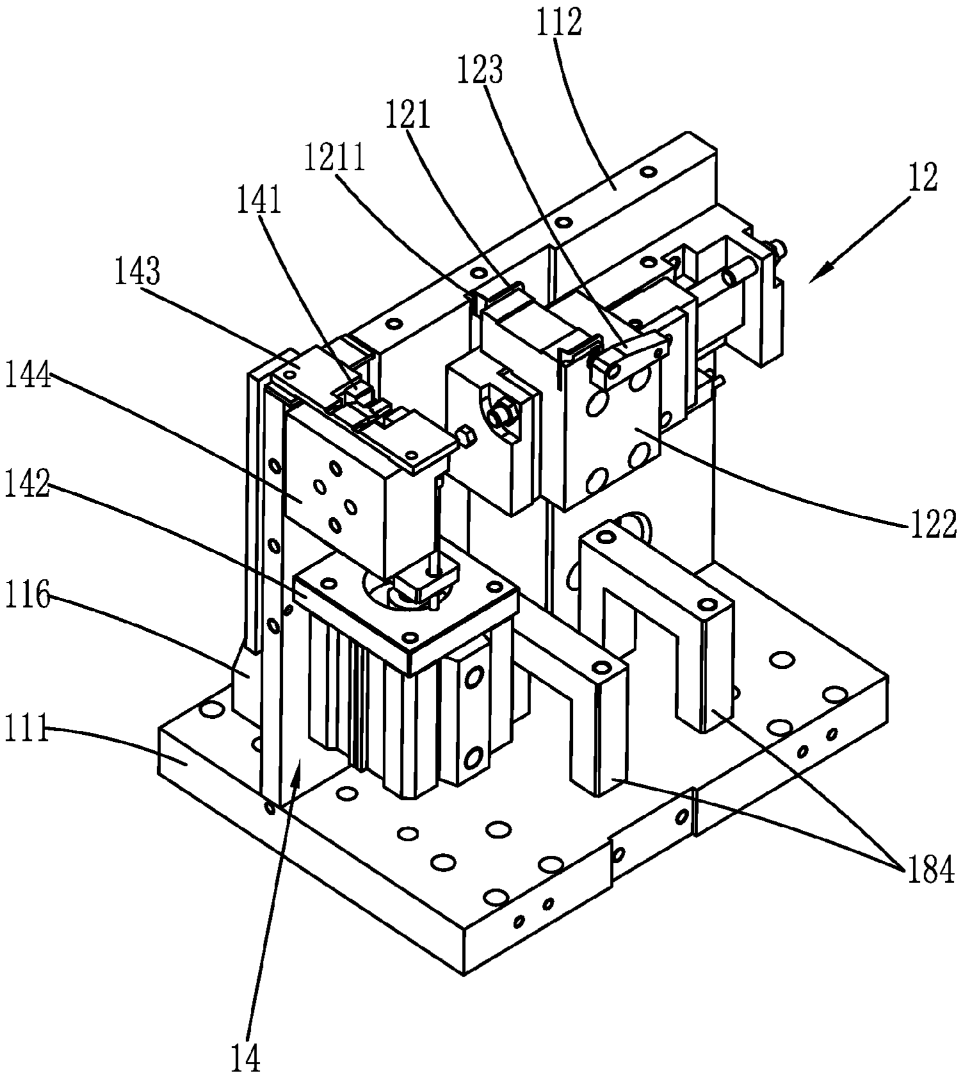
FIG. 8 is a perspective view of a metal shell-cutting mechanism and a material-feeding mechanism of the metal shell cutting and assembling machine of FIG. 1, wherein the metal shell-cutting mechanism and the material-feeding mechanism are mounted on the frame.
Figure 9:
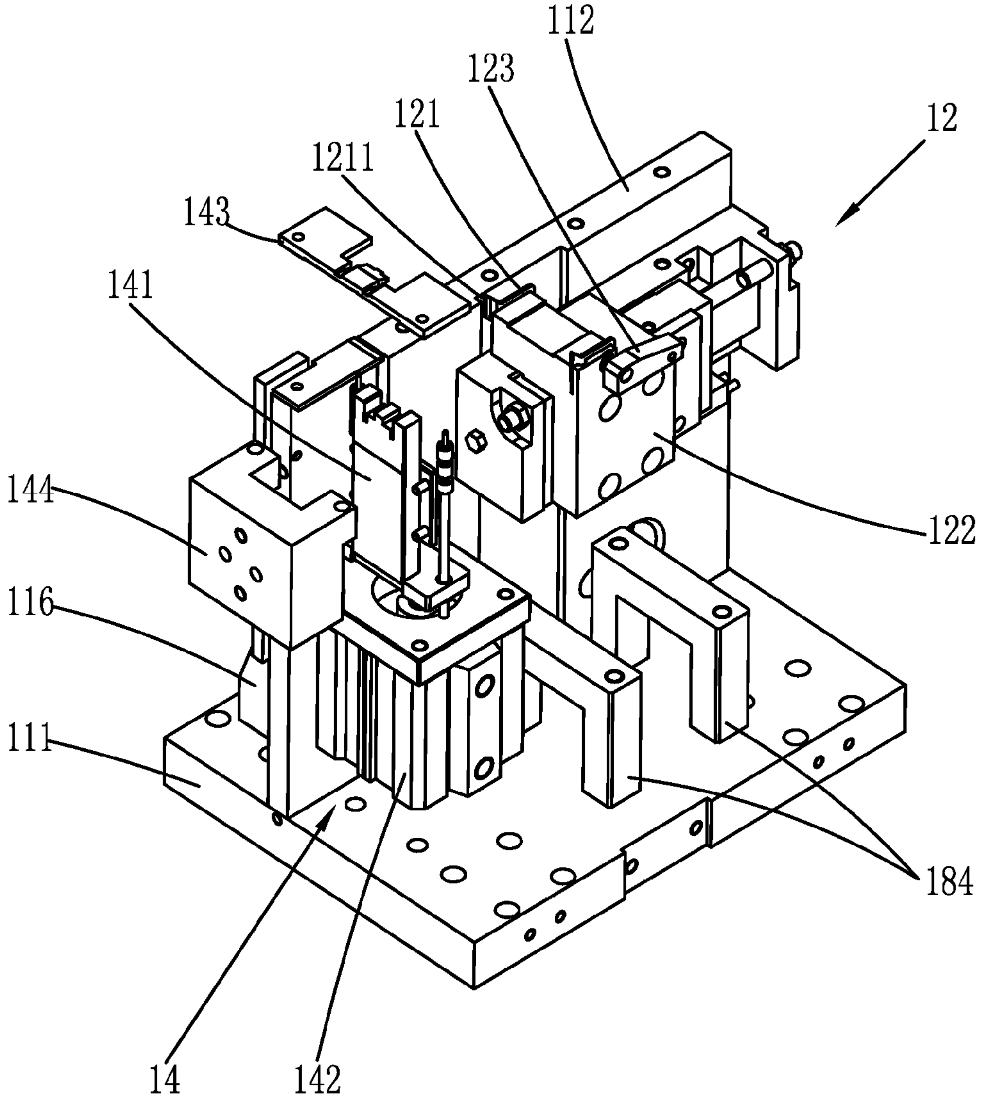
FIG. 9 is a partially exploded view of the metal shell-cutting mechanism of FIG. 8, which is mounted on the frame together with the material-feeding mechanism.

Referring to FIGS. 1, 2 and 5, the metal shell-inserting mechanism 16 is mounted on the frame 11 above the material tape-transferring channel, as shown in FIG. 3. The metal shell-inserting mechanism 16 is adjacent to the input port 1142 (labeled in FIG. 3) of the material tape-transferring channel. The metal shell-inserting mechanism 16 includes a metal shell-pushing rod 161 and a metal shell-pushing driving member. In one embodiment, the metal shell-pushing driving member is a metal shell-pushing cylinder 162, which is mounted on the upper leading plate 113 by a cylinder fixture seat 164 and is electrically connected to the controller. An output shaft of the metal shell-pushing cylinder 162 is connected to one end of a metal shell-pushing head 165, and the other end of the metal shell-pushing head 165 is fixedly connected to the metal shell-pushing rod 161. The metal shell-pushing cylinder 162 can drive the metal shell-pushing head 165 to work, and then the metal shell-pushing head 165 can drive the metal shell-pushing rod 161 to slide along the push rod-sliding groove 1131 of the upper leading plate 113. Whereby the metal shell 21, which is held between the metal shell pressure plate 131 of the pre-press mechanism 13 and the metal shell cutter 141 of the metal shell-cutting mechanism 14, can be pushed unto an assembling end of the push rod passage 153 of the plastic body-inserting mechanism 15.

In order to ensure the assembly quality of the metal shell 21, the metal shell-inserting mechanism 16 further includes a pre-inserting driving member, which is a pre-inserting driving cylinder 163 mounted on the cylinder fixture seat 164 and electrically connected to the controller. The metal shell-pushing cylinder 162 is mounted on the pre-inserting driving cylinder 163. When assembling the metal shell 21, the pre-inserting driving cylinder 163 first starts to work for driving the metal shell-pushing cylinder 162 to move along the material tape-transferring channel, and for simultaneously driving the metal shell-pushing rod 161 to work. When the pre-inserting driving cylinder 163 moves to a designated position, the metal shell-pushing cylinder 162 starts to work. Whereby the metal shell 21 attached on metal shell-pushing rod 161 can be pushed unto the assembling end of the push rod passage 153 of the plastic body-inserting mechanism 15 for assembling.

Figure 10:
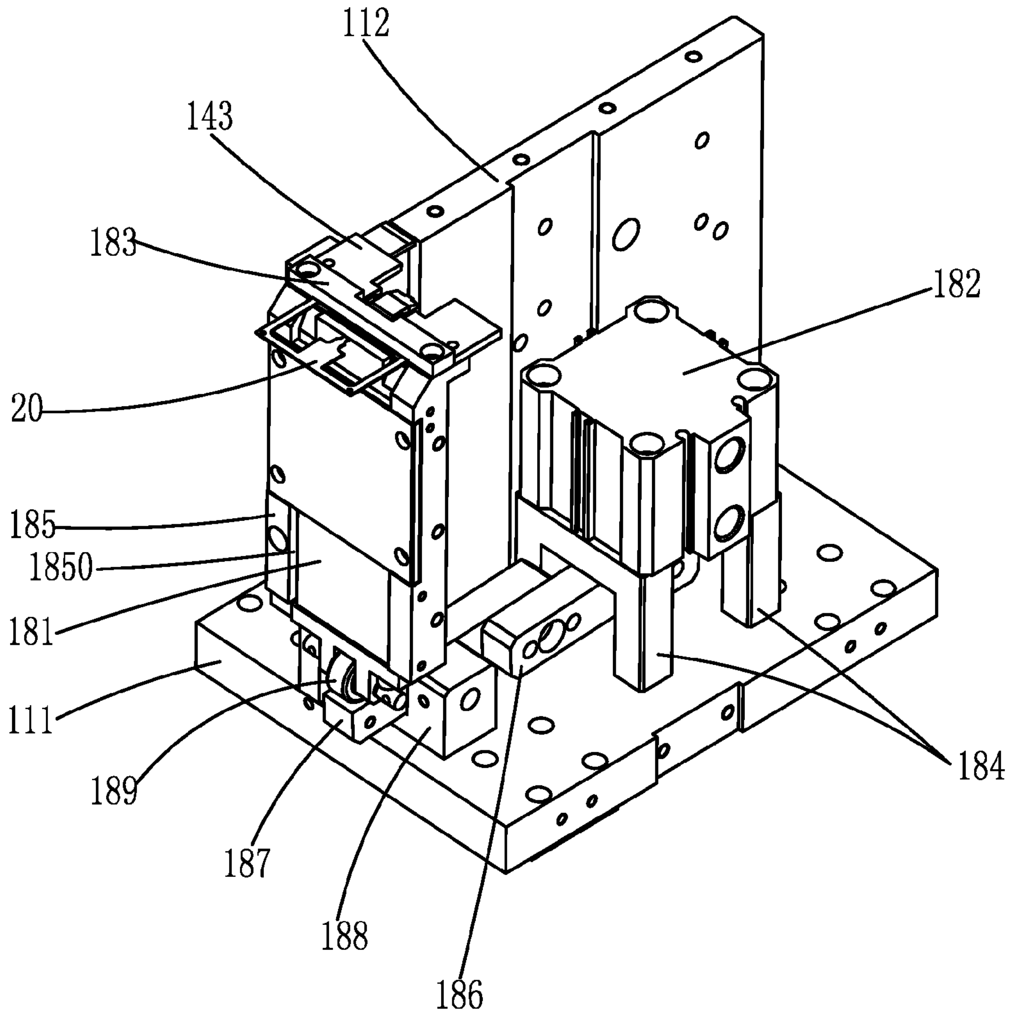
FIG. 10 is a perspective view of a waste material-cutting mechanism of the metal shell cutting and assembling machine of FIG. 1, wherein the waste material-cutting mechanism is mounted on the frame.
Figure 11:
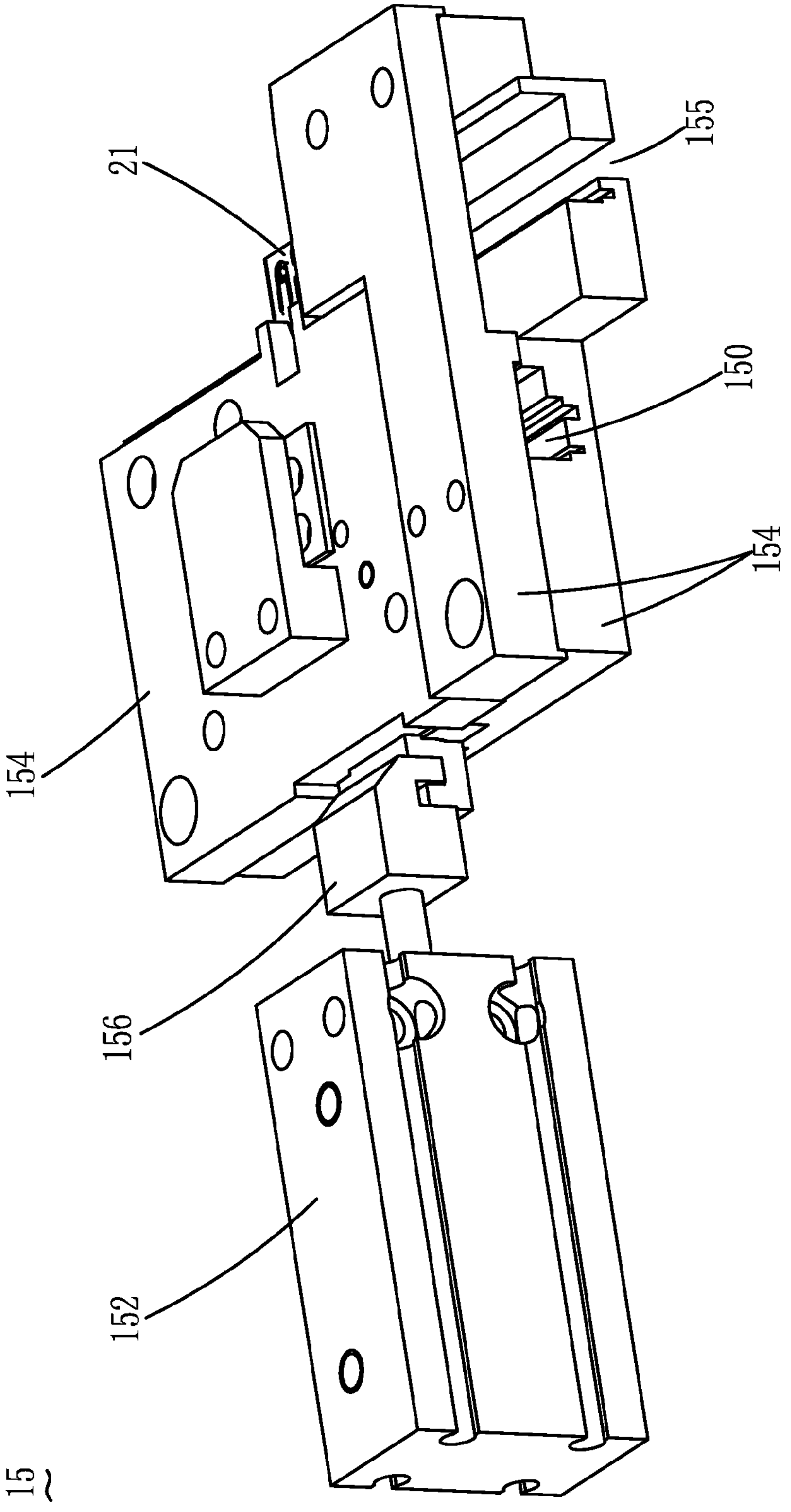
FIG. 11 is a perspective view of a plastic body-inserting mechanism of the metal shell cutting and assembling machine of FIG. 1.

Referring to FIGS. 1, 2 and 10, the metal shell cutting and assembling machine 1 also comprises a waste material-cutting mechanism 18 mounted on the frame 11 below the material tape-transferring channel, as shown in FIG. 3. The waste material-cutting mechanism 18 includes a waste material cutting driving member, a waste material cutter 181, a waste material die base 183 and a waste material transferring component. In one embodiment, the waste material cutting driving member is a waste material-cutting cylinder 182, which is mounted on the bottom plate 111 by a cylinder bracket 184 and is connected to the controller. The waste material die base 183 is mounted on a tail end of the waste material passage of the metal shell die base 143, and is straightly connected to the waste material passage. The waste material cutter 181 is mounted on the supporting plate 112 by a cutter fixture base 185. The cutter fixture base 185 disposes a cutter-sliding groove 1850 provided for the waste material cutter 181 sliding therein so that the waste material cutter 181 can be capable of reliably working. The waste material transferring component includes a first connecting rod 186 and a second connecting rod 187. One end of the first connecting rod 186 is pivotally connected to a piston rod of the waste material-cutting cylinder 182, and the other end thereof is pivotally connected to one end of the second connecting rod 187. The other end of the second connecting rod 187 is pivotally connected to the frame 11 by a pivotal connecting frame 188 and touches onto the waste material cutter 181. In order to enhance the touching reliability between the second connecting rod 187 and the waste material cutter 181 and reduce the friction force therebetween, an idler wheel 189 is disposed on one end of the waste material cutter 181. The waste material-cutting cylinder 182 can drive the first connecting rod 186, which is pivotally connected to the piston rod thereof, to work. Then the first connecting rod 186 can drive the end of the second connecting rod 187, which is pivotally connected to it, to work. Whereby the other end of the second connecting rod 187 can be driven to swing up and down around the pivotal connecting frame 188. The second connecting rod 187 swinging up and down can push the waste material cutter 181 to slide up and down in the cutter-sliding groove 1850 of the cutter fixture base 185. The waste material cutter 181 can cooperate with the waste material die base 183 in cutting away the waste material 20 from the material tape 2. For convenience to reclaim the waste material 20, the present machine 1 also comprises a waste material collection device, which is disposed adjacent to a tail end of the waste material passage of the metal shell die base 143. The waste material collection device is a waste material collection box 17.

Referring to FIGS. 1 to 12, the work principle of the present metal shell cutting and assembling machine 1 will be specifically described.

The following is an assembling process of the metal shell 21 and the plastic body 3 of the connector.

First, the material tape 2 with the metal shell 21 passes through the flattening device 19 to be mounted in the material tape-transferring channel of the frame 11. The tip end 1211 of the pulling claw 121 is inserted into the positioning hole of the material tape 2. Next, the controller controls the material tape-transferring cylinder 122 to move along a first direction pointed by an arrow A of FIG. 1. When the material tape-transferring cylinder 122 moves from a rightmost end to a leftmost end, the material tape 2 can be transferred a distance, which is equal to a distance between two adjacent positioning holes of the material tape 2, and is also equal to a distance between two cutting sections of two adjacent metal shell 21 of the material tape 2. The moving distance of the material tape-transferring cylinder 122 can be freely adjusted according to two adjacent positioning holes of the different material tape 2. When the material tape-transferring cylinder 122 arrives at the leftmost end, the controller controls the pressure plate-driving cylinder 132 of the pre-press mechanism 13 to move along a second direction pointed by an arrow B of FIG. 1. Because there is the spring member disposed between the metal shell pressure plate 131 and the cylinder fixture plate 133, the metal shell pressure plate 131 can follow the cylinder-connecting block 135 fixed on the output shaft of the pressure plate-driving cylinder 132 to move downward together under the function of the gravity of the metal shell pressure plate 131 until firmly pressing the metal shell 21 of the material tape 2 transferred by the material-feeding mechanism 12. Whereby it has got ready for the metal shell-cutting mechanism 14 to cutting the metal shell 21.

Secondly, the controller controls a piston rod of the metal shell-cutting cylinder 142 of the metal shell-cutting mechanism 14 to move along a reverse direction of the second direction pointed by the arrow B of FIG. 1. The piston rod of the metal shell-cutting cylinder 142 can push the metal shell cutter 141 to slide in the cutter fixture seat 144. The metal shell cutter 141 cooperating with the metal shell die base 143 can cut away the metal shell 21 from the material tape 2. When the metal shell cutter 141 after cutting away the metal shell 21 continues to be pushed upward, the cylinder-connecting block 135 carrying the metal shell pressure plate 131 can only move along the reverse direction of the second direction pointed by the arrow B of FIG. 1. Specially, the metal shell cutter 141 can push the metal shell pressure plate 131 to move along the reverse direction of the second direction pointed by the arrow B of FIG. 1, because the pushing force of the metal shell cutter 141 produced by the metal shell-cutting cylinder 142 is larger than a resultant force including the gravity of the metal shell pressure plate 131 and the elastic force of the spring member. Now, the metal shell 21 after being cut away can be held between the metal shell cutter 141 and the metal shell pressure plate 131, and just faces to the metal shell-pushing rod 161 of the metal shell-inserting mechanism 16. Namely, the metal shell 21 is lying on a moving passage of the metal shell-pushing rod 161 of the metal shell-inserting mechanism 16. Whereby the metal shell-pushing rod 161 can push the metal shell 21 onto the assembling end of the push rod passage 153 of the plastic body-inserting mechanism 15.

Simultaneously, the material tape 2 after being cutting away the metal shell 21 passes through the waste material passage of the metal shell die base 143 and is transferred at the waste material-cutting mechanism 18 provided for cutting away the waste material 20. Now, the controller controls the piston rod of the waste material-cutting cylinder 182 of the waste material-cutting mechanism 18 to extend toward the bottom plate 111, so that the first connecting rod 186 pivotally connected to the piston rod of the waste material-cutting cylinder 182 can be driven to move, and can further drive the one end of the second connecting rod 187, which is pivotally connected to the first connecting rod 186, to move. Therefore, the other end of the second connecting rod 187 can be raised toward the reverse direction of the second direction pointed by the arrow B of FIG. 1 around the pivotal connecting frame 188, for pushing the waste material cutter 181 to slide in the cutter fixture base 185. The waste material cutter 181 cooperating with the cutter fixture base 185 can cut away the waste material 20. The waste material 20 after being cut away just falls into the waste material collection box 17.

Next, the controller controls the pre-inserting driving cylinder 163 of the metal shell-inserting mechanism 16 to move along the first direction pointed by the arrow A of FIG. 1. The pre-inserting driving cylinder 163 can drive the metal shell-pushing cylinder 162 fixedly connected thereto to move, so that the metal shell-pushing rod 161 can follow the metal shell-pushing cylinder 162 to move in the push rod-sliding groove 1131 of the upper leading plate 113 for engaging with the metal shell 21, which is held between the metal shell pressure plate 131 and the metal shell cutter 141. When the pre-inserting driving cylinder 163 moves to the designated position, the controller controls the metal shell-pushing cylinder 162 to continue to move along the first direction pointed by the arrow A of FIG. 1, and to drive the metal shell-pushing head 165 to move. Whereby the metal shell-pushing rod 161 fixed on the metal shell-pushing head 165 can be driven to continue to slide in the push rod-sliding groove 1131 and can push the metal shell 21 onto the assembling end of the push rod passage 153 of the plastic body-inserting mechanism 15. Then, the controller controls the plastic body-pushing cylinder 152 of the plastic body-inserting mechanism 15 to move for pushing the plastic body-pushing head 156 connected to the output shaft thereof to move along a third direction pointed by an arrow C of FIG. 1. Whereby the plastic body-pushing rod 151 fixed on the plastic body-pushing head 156 can be driven to slide along the push rod passage 153 of the frame body 154, to push the plastic body 3, which is transferred from the plastic body-transferring passage 150 to the push rod passage 153, onto the assembling end of the push rod passage 153, and to assemble the plastic body 3 and the metal shell 21 coming from the metal shell-pushing rod 161 into a combination component.

When restoring, the controller controls the pressure plate-driving cylinder 132 of the pre-press mechanism 13 to move along the reverse direction of the second direction pointed by the arrow B of FIG. 1, and to pull the cylinder-connecting block 135 connected to the output shaft thereof to upward. The cylinder-connecting block 135 pulled upward can drive the metal shell pressure plate 131 to slide in the pressure plate-mounting plate 134. Because the spring member is disposed between the metal shell pressure plate 131 and the cylinder fixture plate 133, the metal shell pressure plate 131 can follow the cylinder-connecting block 135 to slowly restore to the original state for being ready to next work. Next, the controller controls the plastic body-pushing cylinder 152 of the plastic body-inserting mechanism 15 to restore along a reverse direction of the third direction pointed by the arrow C of FIG. 1 for being ready to next work. Now, the controller controls the piston rod of the waste material-cutting cylinder 182 of the waste material-cutting mechanism 18 to retract away from the bottom plate 111. The first connecting rod 186 pivotally connected to the piston rod of the waste material-cutting cylinder 182 can be driven to move, and further drive the one end of the second connecting rod 187 to move. Now, the other end of the second connecting rod 187 can move downward around the pivotal connecting frame 188, namely move toward the bottom plate 111, so that the waste material cutter 184 can follow the second connecting rod 187 to move downward, thereby making the waste material-cutting mechanism 18 restore to the original state for being ready to next work.

Then, the controller controls the piston rod of the metal shell-cutting cylinder 142 of the metal shell-cutting mechanism 14 to restore along the second direction pointed by the arrow B of FIG. 1. Under the function of the elastic force and the gravity of the metal shell cutter 141, the metal shell cutter 141 can follow the piston rod of the metal shell-cutting cylinder 142 to restore for being ready to next work. Now, the controller controls the pre-inserting driving cylinder 163 together with the metal shell-pushing cylinder 162 to move along the reverse direction of the first direction pointed by the arrow A of FIG. 1, so that the metal shell-pushing rod 161 connected to the metal shell-pushing head 165 can be driven to slide in the push rod-sliding groove 1131 of the upper leading plate 113 and to move away from the assembling end of the push rod passage 153 for finally restoring to the original state. The combination component disengaged with the metal shell-pushing rod 161 can be transferred to a corresponding device along a component-collecting channel 155 of the frame body 154.

Finally, the controller controls the metal shell-pushing cylinder 162 continues to move along the reverse direction of the first direction pointed by the arrow A of FIG. 1, and to drive the metal shell-pushing head 165 to restore, and to further drive the metal shell-pushing rod 161 to restore for being ready to next work. Now, the controller controls the material tape-transferring cylinder 122 of the material-feeding mechanism 12 to move along the reverse direction of the first direction pointed by the arrow A of FIG. 1 thereby driving the pulling claw 121 and the shaking block 123 to follow it to move. Because the left side of the tip end 1211 of the pulling claw 121 is a vertical flat surface and the right side thereof is an inclined surface, the pulling claw 121 can not drive the material tape 2 to move along the reverse direction of the first direction pointed by the arrow A of FIG. 1, thereby ensuring the working reliability of the material-feeding mechanism 12.

After the material tape-transferring cylinder 122 restoring to the original state, because the pulling claw 121 and the shaking block 123 straightly jointed together are located two sides of the pivot shaft, the pulling claw 121 can rotate along clockwise (as based on FIG. 9) around the pivot shaft under the gravity of the shaking block 123 until the frame 11 prevents the shaking block 123 from rotating. Now, the pulling claw 121 and the shaking block 123 are again parallel to the horizontal plane, and the tip end 1211 of the pulling claw 121 is again inserted into a next positioning hole of the material tape 2 for being ready to next work.

As described above, the metal shell cutting and assembling machine 1 employs the material-feeding mechanism 12 to automatically transfer the material tape 2, and employs the pre-press mechanism 13 to firmly press the metal shell 21 on the material tape 2 transferred by the material-feeding mechanism 12, and employs the metal shell-cutting mechanism 14 can cut away the metal shell 21 pressed by the pre-press mechanism 13. So the present machine 1 can automatically cut the material tape 2 with the metal shell 21. Moreover, the present machine 1 also employs the metal shell-inserting mechanism 16 to push the metal shell 21, which is held between the pre-press mechanism 13 and the metal shell-cutting mechanism 14, onto the plastic body-inserting mechanism 15, so that the plastic body 3 coming from the plastic body-inserting mechanism 15 and the metal shell 21 coming from the metal shell-inserting mechanism 16 can be assembled together. Therefore, the present machine 1 can be capable of automatically assemble the metal shell 21 with the plastic body 3. The present machine 1 can enhance the manufacture efficiency, reduce the labor cost and be suitable for mass production. Moreover the obtained assembling component has a good uniformity and a high qualification rate.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A metal shell cutting and assembling machine, for automatically cutting a material tape with metal shells and assembling the metal shell after being cut away from the material tape with a plastic body of a connector, the machine comprising:

a frame, having a material tape-transferring channel provided for carrying the material tape;

a material-feeding mechanism, being mounted on the frame below the material tape-transferring channel and adjacent to an input port of the material tape-transferring channel, and comprising a material tape-driving member and a pulling claw, wherein one end of the pulling claw can be engaged with the material tape and the other end thereof is pivotally connected to the material tape-driving member, and the material tape-driving member can drive the pulling claw to move back and forth along the material tape-transferring channel;

a pre-press mechanism, being mounted on the frame above the material tape-transferring channel and adjacent to an output port of the material tape-transferring channel, and comprising a metal shell pressure plate, a pressure plate-driving member and a spring member, wherein the spring member is elastically mounted between the pressure plate-driving member and the metal shell pressure plate, the pressure plate-driving member is fixedly connected to the metal shell pressure plate and can drive the metal shell pressure plate to move toward the metal shell of the material tape for being capable of pressing the metal shell;

a metal shell-cutting mechanism, which is mounted on the frame below the material tape-transferring channel, faces to the pre-press mechanism, and comprises a metal shell-cutting driving member, a metal shell cutter and a metal shell die base cooperating with the metal shell cutter in cutting the metal shell, wherein the metal shell die base is located at the output port of the material tape-transferring channel and disposes a waste material passage provided for transferring a waste material, the metal shell-cutting driving member is connected to the metal shell cutter and can drive the metal shell cutter to move along the metal shell die base for cutting away the metal shell of the material tape transferred from the material-feeding mechanism and for detaching the metal shell and the waste material, and the metal shell after being detached is held between the metal shell pressure plate and the metal shell cutter;

a plastic body-inserting mechanism, being disposed on the frame outside of the output port of the material tape-transferring channel, and comprising a frame body, a plastic body-pushing driving member and a plastic body-pushing rod, wherein the frame body has a plastic body-transferring passage for carrying the plastic body and a push rod passage arranged perpendicularly to and in communication with the plastic body-transferring passage, the push rod passage is disposed above and parallel to the material tape-transferring channel, horizontal central lines of the push rod passage and the material tape-transferring channel coincide with each other, and the plastic body-pushing driving member can drive the plastic body-pushing rod to move in the push rod passage for pushing the plastic body to be assembled with the metal shell;

a metal shell-inserting mechanism, being mounted on the frame above the material tape-transferring channel and adjacent to the input port of the material tape-transferring channel, and comprising a metal shell-pushing rod and a metal shell-pushing driving member, wherein the metal shell-pushing driving member can drive the metal shell-pushing rod to move along the push rod passage and further push the metal shell to move unto the push rod passage for being assembled with the plastic body; and a controller, being electrically connected to the material tape-driving member, the pressure plate-driving member, the metal shell-cutting driving member, the plastic body-pushing driving member and the metal shell-pushing driving member.

2. The metal shell cutting and assembling machine as claimed in claim 1, further comprising a waste material-cutting mechanism, which is mounted on the frame below the material tape-transferring channel and comprises a waste material cutting driving member, a waste material cutter and a waste material die base, wherein the waste material die base is mounted on a tail end of the waste material passage of the metal shell die base, the controller is electrically connected to the waste material cutting driving member, and the waste material cutting driving member drives the waste material cutter to move along the waste material die base for cutting away the waste material of the material tape.

3. The metal shell cutting and assembling machine as claimed in claim 2, wherein the waste material-cutting mechanism also comprises a waste material transferring component including a first connecting rod and a second connecting rod, one end of the first connecting rod is pivotally connected to the waste material cutting driving member and the other end thereof is pivotally connected to one end of the second connecting rod, and the other end of the second connecting rod is pivotally connected to the frame and touches onto the waste material cutter.

4. The metal shell cutting and assembling machine as claimed in claim 1, wherein the material-feeding mechanism further comprises a shaking block and a pivot shaft, the shaking block and the pulling claw are located on a same line and are fixed on two opposite sides of the pivot shaft, the pivot shaft is pivotally connected to the material tape-driving member, the pulling claw has a tip end for engaging with the material tape, and the shaking block and the pulling claw are parallel to one horizontal plane.

5. The metal shell cutting and assembling machine as claimed in claim 1, wherein the frame includes a bottom plate, a supporting plate and a channel component defining the material tape-transferring channel, the bottom plate is parallel to a horizontal plane, the supporting plate is stood on the bottom plate, and the channel component is mounted on the supporting plate.

6. The metal shell cutting and assembling machine as claimed in claim 5, wherein the channel component includes an upper leading plate and a lower leading plate, two sides of the upper leading plate are mounted on the supporting plate, one end of the upper leading plate is fixedly connected to the lower leading plate, the upper leading plate disposes a push rod-sliding groove formed on a top surface thereof and provided for sliding the metal-shell pushing rod, the upper leading plate disposes an upper transferring channel formed on a bottom surface thereof, the lower leading plate disposes a lower transferring channel formed on a top surface thereof and corresponding to the upper transferring channel, the upper and lower transferring channels together form the material tape-transferring channel for transferring the material tape.

7. The metal shell cutting and assembling machine as claimed in claim 1, wherein the metal shell-inserting mechanism further includes a pre-inserting driving member electrically connected to the controller, the pre-inserting driving member is connected to the metal shell-pushing driving member and drives the metal shell-pushing driving member to move along the push rod passage.

8. The metal shell cutting and assembling machine as claimed in claim 1, wherein the pre-press mechanism further includes a pressure plate-mounting plate mounted on the frame, the metal shell pressure plate is mounted on the pressure plate-mounting plate and slides along it.

9. The metal shell cutting and assembling machine as claimed in claim 1, wherein the metal shell-cutting mechanism further includes a cutter fixture seat and a spring member elastically mounted between the metal shell cutter and the cutter fixture seat, the metal shell cutter is mounted on the cutter fixture seat and slides along it.

10. The metal shell cutting and assembling machine as claimed in claim 1, further comprising a waste material collection device, which is disposed adjacent to a tail end of the waste material passage.

* * * * *